United States Patent [19]

Boles et al.

[11] Patent Number: 4,549,184

[45] Date of Patent: Oct. 22, 1985

[54] MOVING TARGET ORDNANCE CONTROL

[75] Inventors: Sol Boles, Syosset; Walter J. Smrek, Lake Ronkonkoma, both of N.Y.

[73] Assignee: Grumman Aerospace Corporation, Bethpage, N.Y.

[21] Appl. No.: 373,806

[22] Filed: Apr. 30, 1982

Related U.S. Application Data

[63] Continuation-in-part of Ser. No. 272,048, Jun. 9, 1981, which is a continuation of Ser. No. 10,003, Feb. 7, 1979, abandoned.

[51] Int. Cl.⁴ .................. G01S 13/90; G01S 13/52
[52] U.S. Cl. .................. 343/11 R; 343/5 CM; 343/7.7
[58] Field of Search ............ 343/5 CM, 7.7, 8, 9 R; 364/516, 517

[56] References Cited

U.S. PATENT DOCUMENTS

| | | | |
|---|---|---|---|
| 3,178,711 | 4/1965 | Case, Jr. | 343/16 |
| 3,223,997 | 12/1965 | Clark et al. | 343/5 DP |
| 3,346,859 | 10/1967 | Mullins et al. | 343/7.7 |
| 3,683,373 | 8/1972 | Barnes et al. | 343/11 R X |
| 3,735,399 | 5/1973 | Sletten et al. | 343/7.7 |
| 3,735,400 | 5/1973 | Sletten et al. | 343/7.7 |
| 3,737,900 | 6/1973 | Vehrs, Jr. | 343/7 A |
| 3,768,096 | 10/1973 | Dentino | 343/7 A |
| 3,903,525 | 9/1975 | Mullins et al. | 343/7.7 |
| 3,962,704 | 6/1976 | Evans | 343/7.7 |
| 3,972,041 | 7/1976 | Howard | 343/7.7 |
| 3,975,734 | 8/1976 | Payne | 343/7.7 |
| 3,993,994 | 11/1976 | Goggins | 343/5 CM |
| 4,034,370 | 7/1977 | Mims | 343/5 CM |
| 4,086,590 | 4/1978 | Goggins, Jr. | 343/5 CM |
| 4,204,210 | 5/1980 | Hose | 343/5 CM X |

Primary Examiner—T. H. Tubbesing
Assistant Examiner—Gilberto Barron, Jr.
Attorney, Agent, or Firm—Richard G. Geib; Daniel J. Tick; Bernard S. Hoffman

[57] ABSTRACT

In an airborne radar system, moving ground targets are identified on a cathode ray tube (CRT) display and their motion tracked to allow precise delivery of air-to-ground weapons. Target location errors, due to the effect of target motion upon the doppler frequency of the received signals, and consequent angle measurement ambiguities introduced by the presence of clutter are significantly reduced. The target's radial velocity with respect to the electrical boresight of the system antenna is determined and a corresponding frequency adjustment is made to the processed signal in order to accurately locate the target on the display to lie in precise correspondence to its displayed stationary surroundings.

The determination of target radial velocity also provides the measurement of target radial velocity also provides a precise interferometer antenna referenced azimuth angle estimate to be used for relative range and azimuth weapon guidance, independent of usually large angle errors arising from clutter effects within the field of view of the antenna, and of other hardware and navigational error sources associated with absolute angle measurement systems.

17 Claims, 13 Drawing Figures

| ANT. POS | TRANS |
|---|---|
| 1 | M1 |
| 2 | M2 |
| 3 | M3 |
| 4 | M4 |
| 5 | M5 |
| 6 | M6 |
| 7 | M7 |
| 8 | M8 |
| 9 | M9 |
| 10 | M10 |
| 11 | M11 |
| 12 | M12 |
| 13 | M13 |
| 14 | M14 |
| 15 | M15 |
| 16 | M16 |
| 17 | M17 |
| ↓ | |

FIG. 6A

| RECEIVE FORMAT | | | |
|---|---|---|---|
| LOS | RECEIVE | | |
| 1 | L1 | M2 | R3 |
| 3 | L3 | M4 | R5 |
| 5 | L5 | M6 | R7 |
| 7 | L7 | M8 | R9 |
| 9 | L9 | M10 | R11 |
| 11 | L11 | M12 | R13 |
| 13 | L13 | M14 | R15 |
| 15 | L15 | M16 | R17 |
| ↓ | | | |

1ST. ARRAY
2ND. ARRAY
3RD. ARRAY

| PULSE NUMBER → | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| TO RECEIVER (44) → | L1 | | L3 | | L5 | | L7 | | L9 | | L11 | | L13 | | L15 | | L17 |
| TO RECEIVER (44) → | | M2 | | M4 | | M6 | | M8 | | M10 | | M12 | | M14 | | M16 | |
| TO RECEIVER (45) → | R1 | | R3 | | R5 | | R7 | | R9 | | R11 | | R13 | | R15 | | R17 |

MOVING TARGET ORDNANCE CONTROL

BACKGROUND OF THE INVENTION

This application is a continuation-in-part of copending application Ser. No. 272,048, filed June 9, 1981, which in turn is a continuation of application Ser. No. 010,003, filed Feb. 7, 1979, now abandoned.

The present invention relates to radar controlled weapons systems and, more particularly, to a method and apparatus for ameliorating the effects of ambiguous main beam clutter on antenna sensed azimuth angle measurements and for simultaneously providing synthetic aperture radar displayed imagery of fixed targets, clutter and moving targets, enabling precise, command guided weapon delivery using relative range and azimuth angle techniques. The invention may be used in conjunction with existing radar systems to allow ordnance delivery to stationary targets as well.

It is well known that the reflected radar signal from a moving ground target may exhibit a doppler frequency appreciably different from that of ground scatterers in its immediate vicinity due to the additional doppler frequency shift caused by the component of target velocity along the line-of-sight direction, when observed from a moving airborne platform. Since the synthetic aperture radar display maps each scatterer with an intensity proportional to its signal strength in a range versus azimuth angle coordinate frame, wherein azimuth angle is scaled according to the doppler frequency, a moving target having an additional doppler frequency component due to the target radial motion may be incorrectly located in azimuth on the radar display. If the resulting doppler shift is sufficiently great, e.g., beyond the frequency range of the ground clutter being mapped, the target could fall off the display entirely.

Existing Airborne Moving Target Indication (AMTI) radar systems recognize the existence of motion induced azimuthal error and attempt to correct for this problem by using antenna sensed azimuth angle measurements versus doppler frequency and recognizing that this relationship plots into essentially a straight line for fixed targets and clutter. A discontinuity in this linear plot, subject to meeting certain thresholding requirements, is identified as a moving target and is projecting in doppler frequency, at the same antenna sensed azimuth angle, onto the straight line. The doppler change traversed by this projection is used to relocate the identified moving target in azimuth on the display so that it appears in the context of its perceived surroundings. The antenna sensed azimuth angle is used as a measure of azimuth location for weapon guidance.

Such techniques, however, are still subject to substantial errors in display location as well as azimuth angle measurement required for weapon guidance. In practice, the moving target's net doppler frequency may fall within the main beam clutter frequency spectrum. At such time, the doppler filter containing the moving target signal also contains signal from stationary clutter from a totally different azimuth angle within the main beam. It is the presence of this clutter signal in the target doppler filter that produces serious errors in moving target azimuth angle measurement. It can further be seen that errors in antenna sensed azimuth angle measurement will produce corresponding errors in display relocation.

In effect, these contemporary techniques fail to account for the degradation in azimuth angle measurement accuracy caused by the ambiguous main beam clutter patch whose signal appears in the target doppler filter. In actual practice, this error may be many times that permitted for accurate radar guided weapon delivery, and in addition, may be unacceptable for display purposes.

It is accordingly a general object of the present invention to overcome the aforementioned limitations and drawbacks associated with existing systems.

It is a specific object of the present invention to provide a method and apparatus for ameliorating the effects of ambiguous main beam clutter on antenna sensed azimuth angle measurements.

It is another object of the present invention to provide a method and apparatus for simultaneously providing synthetic aperture radar displayed imagery of fixed targets, clutter and moving targets, enabling precise, command guided weapon delivery using relative range and azimuth angle techniques.

It is a still further object of the present invention to provide a method and apparatus for reducing to negligible levels the effects of potentially significant second order phase errors on displayed relocation and azimuth angle accuracies, which errors are due to off-boresight location of the moving target and false clutter patch.

Other objects will be apparent in the following detailed description and practice of the invention.

SUMMARY OF THE INVENTION

The foregoing and other objects and advantages which will be apparent in the following detailed description of the preferred embodiment, or in the practice of the invention, are achieved by the invention disclosed herein, which generally may be characterized as a method and apparatus for ameliorating, in conjunction with an AMTI synthetic aperture radar system having a three phase center interferometer antenna and a range versus azimuth angle display, the effects of ambiguous main beam clutter on antenna sensed azimuth angle measurements and for simultaneously providing synthetic aperture radar displayed imagery of fixed targets, clutter and moving targets, enabling precise, command guided weapon delivery using relative range and azimuth angle techniques.

In accordance with the teachings of the invention, the azimuth angle of a moving target having a radial component of velocity relative to the electrical boresight of the interferometer antenna is determined with improved accuracy by measuring the radial component of velocity $V_m$ of the moving target, shifting the observed net doppler frequency of the moving target by the quantity $$-\frac{2 V_m}{\lambda},$$

where $\lambda$ is the operating wavelength of the radar system, so that the moving target resides in a doppler cell whose frequency corresponds to that of clutter in the immediate vicinity of the moving target, plotting the data obtained from interleaved interferometric measurements on the received signals from stationary clutter and fixed targets as doppler frequency versus interferometer azimuth angle, and obtaining from the plot of doppler frequency versus interferometer azimuth angle for the stationary clutter and fixed targets the azimuth angle relative to the electrical boresight of the antenna of clutter in the immediate vicinity of the moving target. The obtained azimuth angle information is used for relative range and azimuth angle weapon guidance and the shifted doppler frequency is used to accurately position the moving target on the range versus azimuth angle display.

BRIEF DESCRIPTION OF THE DRAWINGS

FIGS. 6A, B and C illustrate multiple signal transmission and reception points with respect to the antenna boresight direction at a plurality of spaced locations along the platform's flight path;

DETAILED DESCRIPTION OF THE PREFERRED EMBODIMENT

In a typical scenario for air-to-ground weaponry, a missile or glide bomb is maneuvered to the start of a near-vertical terminal trajectory by inertial or radio location mid-course guidance techniques. In the terminal guidance phase, an interferometer antenna system is used in conjunction with a synthetic aperture radar and signal processor to perform measurements of the relative range and azimuth angle between the weapon and a ground target designated by the operator on a high resolution real-time synthetic aperture ground map display.

Figure 1:
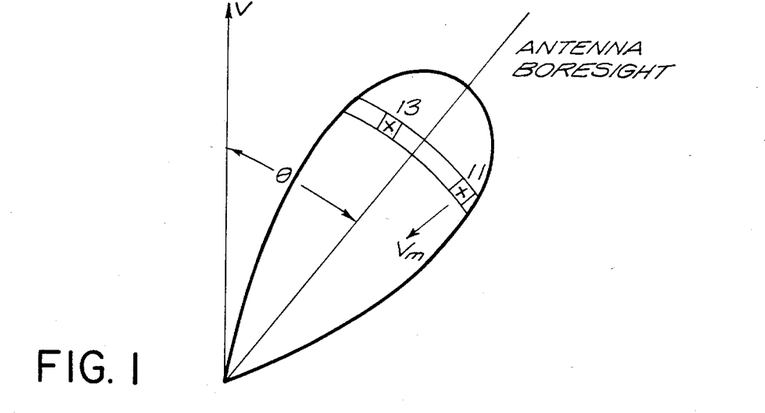
FIG. 1 is a diagram which aids in illustrating the target mislocation problem addressed by the present invention.

As a weapon system closes on a target area, accurate target location information is needed in order to allow precise ordnance delivery. FIG. 1 aids in illustrating the target mislocation problem using conventional techniques. As shown therein, a target at actual location 11, moving with some radial velocity, $V_m$, along the radar line-of-sight, introduces an additional doppler frequency component into the received radar signal due to its motion. In the diagram, V represents aircraft horizontal velocity, and $\theta$, the azimuth angle between aircraft velocity vector and antenna boresight direction. (The effects of depression angle are negligibly small for usual synthetic aperture radar operation, and are, therefore, not included herein). Without the teachings of the present invention, means for relocating the displayed position of the moving target using antenna sensed azimuth angle measurements could be grossly in error of its true location 11 due to the presence of clutter reflected signal from location 13 in the target angle measurement. This interferometrically determined azimuth angle may also be generally unacceptable for accurate ordnance delivery due to this error source.

Figure 2:
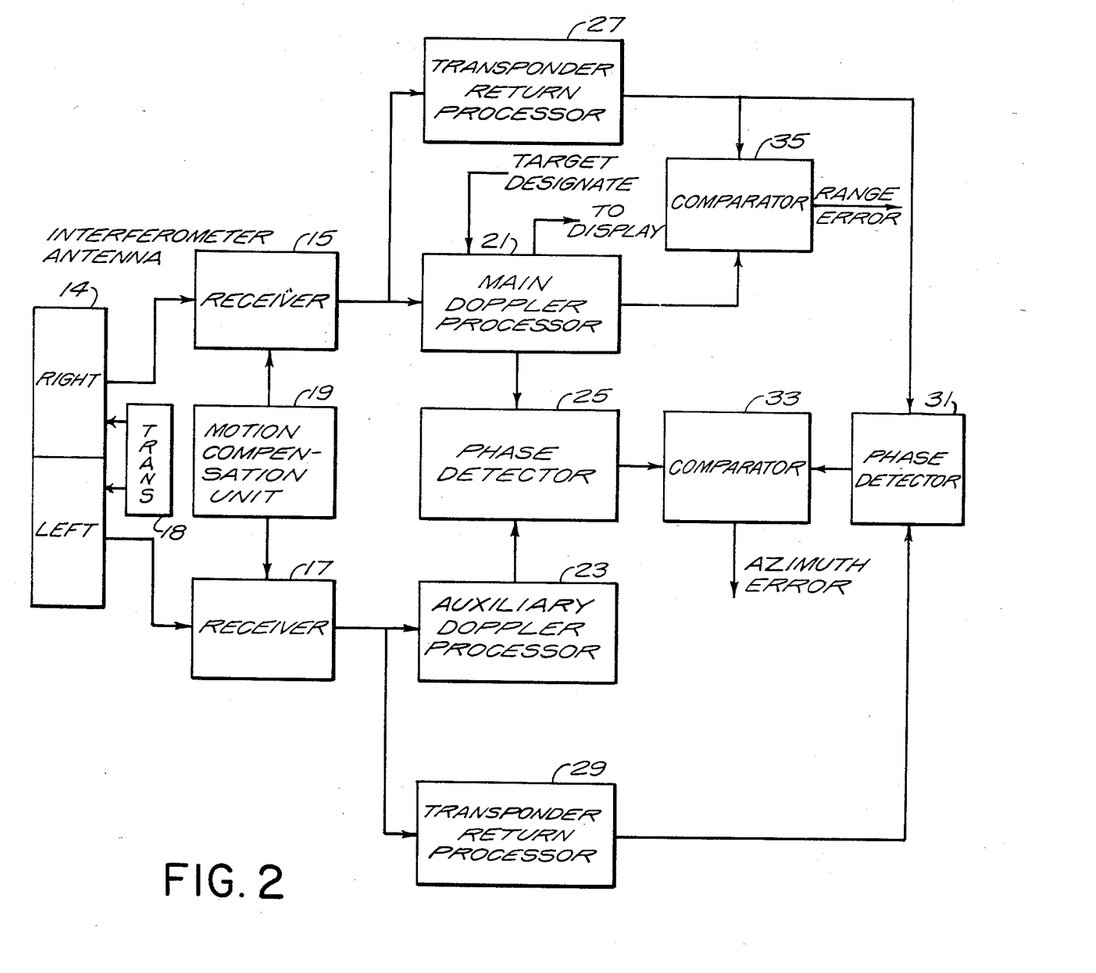
FIG. 2 is a block diagram representation of a relative range and angle processing radar system in accordance with contemporary techniques.

FIG. 2 shows a basic block diagram depicting the relative range and azimuth angle processing using contemporary synthetic aperture radar/interferometer techniques. A command guidance channel from aircraft to weapon provides the necessary information to the weapon to command the weapon trajectory in such a way as to drive the relative range and azimuth separation to zero so that the weapon impacts the target. In addition to decoding command guidance transmissions, the weapon also carries a transponder with which to provide strong signals at the aircraft radar in response to interrogation signals from it for the purpose of enabling accurate measurements of weapon relative range and azimuth angle with respect to a designated ground target.

As represented in FIG. 2, the reflected radar signals are received by Interferometer Antenna 14, having separately excitable right and left portions. Receivers 15 and 17 are designed to adjust to the received signal for amplitude variations and for phase offsets caused by aircraft motion as perceived by Motion Compensation unit 19. Transmitter 18 is adapted to generate radar transmission signals which are transmitted via Interferometer Antenna 14. The compensated signals are demodulated, range sampled, and digitized, and thereupon communicated to the Main and Auxilliary Doppler Processors, 21 and 23, where two identical doppler filter banks are generated by digital signal processing techniques. One exemplary device capable of performing these techniques is a Vector Array Processor, Model No. FPS 120B, produced by Floating Point Systems, Inc. Any range/doppler target cell designated on the display by the operator is isolated in the Main and Auxiliary Doppler Processors, 21,23, and the signals therefrom are routed to the Phase Detector, 25, for interferometric phase comparison to determine target azimuth angle with respect to antenna boresight. Similarly, weapon transponder returns interleaved with ground return signals at the same pulse repetition frequency are routed from Receivers 15 and 17 through Transponder Return Processors 27 and 29. Phase comparison of these outputs at Phase Detector 31, produces the interferometeric azimuth angle of the weapon. Phase detection functions might also be performed by the Vector Array Processor, Model No. FPS 120B. Comparison of Phase Detector outputs from 25 and 31 at Comparator 33, enables the determination of target to weapon relative azimuth angle to be used for weapon guidance. Similarly, comparison of the target range output from the Main Doppler Processor 21, and the Transponder Return Processor 27 at Comparator 35, provides the relative range measurement required for weapon guidance. The transponder return processing and comparing techniques can be implemented by a general purpose digital processor such as the Model PDP11-34M, produced by Norden/DEC.

Figure 3A:
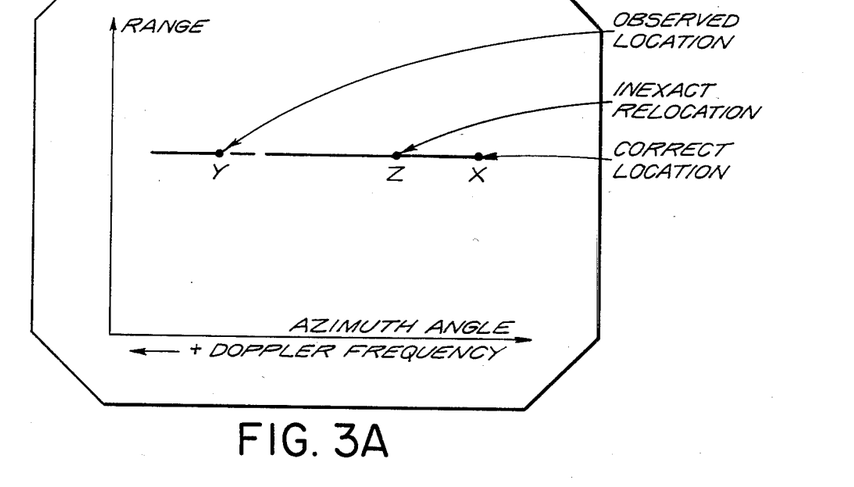
FIG. 3A illustrates a synthetic aperture radar display of range versus azimuth angle for a moving target indicating target location error.

With respect to the current invention, it has been noted that the received signal from a ground target that is moving may have a doppler frequency appreciably different from that of ground scatterers in its immediate vicinity due to the additional doppler frequency shift caused by the component of target velocity along the line-of-sight to the aircraft. Since the synthetic aperture radar display maps each scatterer with an intensity proportional to its sight strength in a range versus azimuth angle coordinate frame, wherein azimuth angle is scaled according to doppler frequency, a moving target may be incorrectly located in azimuth on the display, and, if its doppler shift is sufficiently great; e.g., beyond the frequency range of ground clutter being mapped, could fall off the display entirely. In order for weapon guidance to be performed to such a moving target, it is essential to properly relocate it on the display so that it could be viewed in the context of its surroundings. This initially requires that its range and antenna sensed azimuth angle be determined. Techniques for doing this are best illustrated with the use of FIGS. 3A and 3B, for an aircraft whose radar beam is illuminating the ground to the right, as illustrated in FIG. 1. FIG. 3A depicts a display of range versus azimuth angle, also indicating the direction of increasing doppler shift of ground scatterers. A target moving with a positive radial velocity towards the aircraft will have a doppler shift greater than that of ground clutter in its immediate vicinity. Consequently, its displayed location in range will be correct, but its observed azimuth angle will be displaced to the left (Point Y) from where it correctly should be (Point X). Means for identifying a moving target consist of examining each range bin in turn, and determining for each the straight line which best connects the values of antenna sensed azimuth angle versus doppler cell number (frequency). Range bin sampling may occur at 20 nanosecond intervals or other determinable intervals as desired. Measurements of ground clutter or stationary discretes will fall along this line, whereas, a moving target, whose doppler frequency differs from that of clutter in its immediate vicinity, will fall off the line. Such a point is depicted as Point A' in FIG. 3B, corresponding to Point Y in the Display representation of FIG. 3A.

Figure 3B:
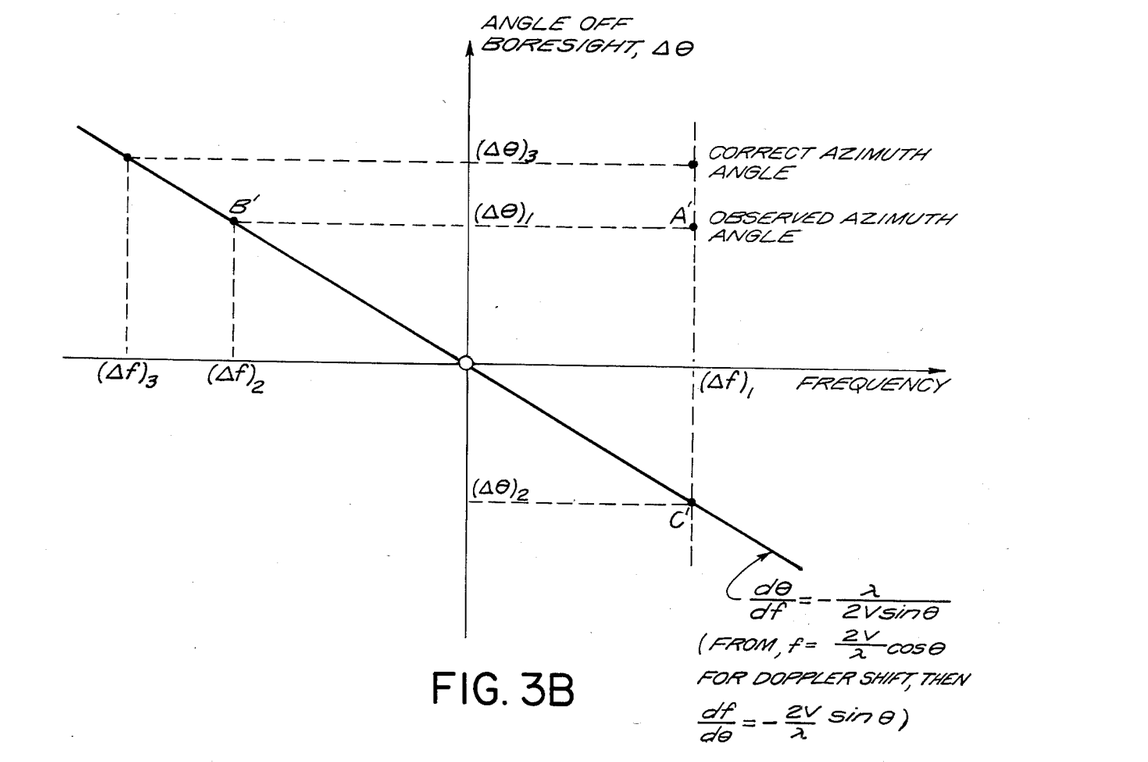
FIG. 3B is a plot of antenna measured azimuth angle versus doppler frequency.

By examining each doppler cell, a point so falling off the straight line (within prescribed amplitude and frequency threshold requirements), can be identified as a moving target. Threshold requirements may include a velocity tolerance on the order of 1-2 ft./sec, in order to eliminate false indications from phenomena such as tree movements due to breeze. Amplitude thresholds may also be established, typically on the order of 10 db, with respect to the average cell clutter level, again to prevent false indications due to noise and the like. The means for target relocation, then, would consist of assigning the value $(\Delta f)_1 - (\Delta f)_2$ as the frequency by which the moving target was erroneously displaced on the display because of its additional doppler frequency due to radial motion, and hence relocating the indicated Point Y on the Display an amount $-[(\Delta f)_1 - (\Delta f)_2]$ to Point Z. In addition, the azimuth angle assigned to the target's location for weapon guidance would be $(\Delta \theta)_1$, the apparent azimuth angle of the moving target as measured by the interferometer antenna. In this manner, one or more moving targets may be relocated for display purposes and tracked in range and azimuth angle over successive synthetic arrays.

Such techniques, however, are subject to substantial errors in display location and azimuth angle measurement for weapon guidance when the moving target's net doppler frequency falls within the main beam clutter frequency spectrum. At such times, the doppler cell containing the moving target signal also contains signal from stationary clutter, but from a totally different azimuth angle within the main beam. This is illustrated as Point C' in FIG. 3B, located at azimuth angle $(\Delta \theta)_2$ with respect to beam boresight. The effect of the spurious clutter signal in the doppler filter of the moving target results in an inaccurate measurement of the azimuth angle of the moving target, denoted as $(\Delta \theta)_1$ in FIG. 3B, rather than $(\Delta \theta)_3$, the assumed correct azimuth angle. Errors of this type may be many times that permitted for accurate radar guided weapon delivery, and in addition, may be unacceptable for display purposes. One unique feature of the present invention is that it permits the accurate determination of the azimuth angle of a moving target with respect to the electrical boresight of the antenna, to which relative azimuth angle measurements of weapon and target are referred for precise weapon guidance. The present invention may have application in conjunction with electronically active or passive weapon systems and may be augmented by many types of standard radar guidance systems to allow accurate delivery of various types of weapons to moving and/or stationary targets. This technique is accomplished by accurately determining the doppler cell the target would lie in if it were not moving at all, and for which accurate interferometric azimuth angle data has been obtained. The equipment required to implement this technique could include any of a number of general purpose processors capable of performing fast fourier transforms or discrete fourier transforms. As one skilled in the art will appreciate, this equipment is readily available from a variety of manufacturers. In addition to achieving accurate moving target azimuth angle, these means also provide precise relocation of displayed moving targets. These results are achieved by making an accurate determination of target radial velocity using clutter cancellation techniques, explained below. Having obtained an accurate estimate of target radial velocity, $V_m$, one substracts the quantity $$\frac{2 V_m}{\lambda}$$

from the observed net doppler frequency of the moving target, $(\Delta f)_1$, to obtain the frequency of the target, $(\Delta f)_3$, were it not moving. (See FIG. 3B). From the straight line plot of doppler frequency versus interferometer azimuth angle for stationary clutter, one obtains the azimuth angle $(\Delta \theta)_3$ of the moving target, corresponding to the target doppler frequency without motion. In addition, the derived frequency, $(\Delta f)_3$, identifies the doppler cell into which the moving target signal must be relocated for display purposes, so that the moving target appears in precise correspondence to its surroundings.

Figure 4:
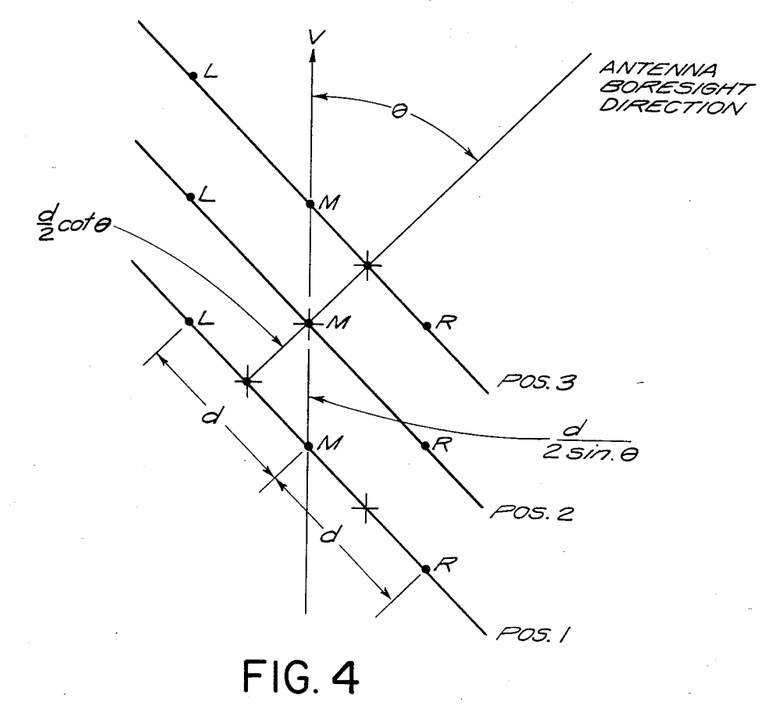
FIG. 4 illustrates multiple signal transmission and reception points with respect to the antenna boresight direction at three spaced locations along the platform's flight path.

The means for clutter cancellation and accurate measurement of target radial velocity are illustrated in FIG. 4 which shows an antenna system in three consecutive positions as the aircraft translates with velocity, V, as shown. Mechanically gimballed antenna systems, such as model AN/APQ-156, manufactured by Norden Company and carried within the Navy/Grumman Corporation A-6E heavy attack aircraft, may be adapted for use with the invention by addition of a 3 phase center receiving antenna. Electronically steered antenna systems, such as the RARF Antenna, produced by Emerson Electric Company can also be adapted in this manner. Signal reception can occur at three equally spaced phase centers (separated by distance, d), denoted by L, M and R (having closely matched antenna patterns), and transmission from a phase center coincident with M. In the implementation shown, signal reception occurs at no more than two phase centers at a time, so that the two channel receiver and processing system of FIG. 2 applies. In FIG. 4, the antenna electrical boresight direction is shown perpendicular to the line passing through the colinear phase centers L, M and R. These points could be actual phase centers of an antenna system mechanically stabilized to the actual boresight direction, or equivalently, L, M and R could be the projections of the actual phase centers of a sidelooking antenna system onto a plane perpendicular to the boresight direction. Transmission from M and reception at L (or R) corresponds to an equivalent single two-way phase center midway between the two points for all returns about boresight. As the antenna moves forward with the aircraft, consecutive receptions at L, M and R for the three antenna positions shown give rise to three two-way phase centers (shown as "+") all aligned with the boresight direction. The pulse repetition frequency (prf) is variable in response to aircraft velocity and boresight angle as to equal $2V \sin \theta/d$, where V is the aircraft velocity, in order for this precise alignment to occur. (This is evident from FIG. 4.) Accordingly, the three signals received from a stationary scatterer along boresight will be of equal amplitudes and in phase after motion compensation, since motion compensation corrects for phase center radial advance due to aircraft motion. Typical of on-board aircraft motion compensating unit is the ASN 92 unit produced by Litton Industries.

Similarly, the signals received at the three successive phase centers (after motion compensation) from a target along boresight moving with a closing radial velocity, Vm, will advance in phase between pulses (separated in time by $\Delta T = 1/PRF$) by an amount, $$\phi = \frac{4\pi}{\lambda} Vm(\Delta T) = \frac{4\pi}{\lambda} \frac{Vm}{PRF} = \frac{2\pi d}{\lambda} \frac{Vm}{V\sin\theta} \quad (1)$$

where, $\lambda$ = radar operating wavelength.

Figure 5:
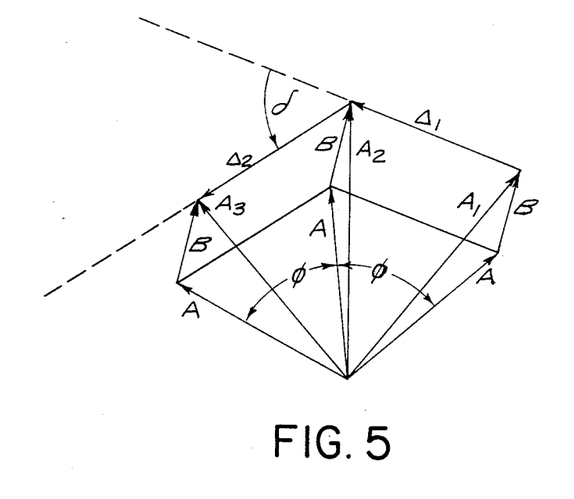
FIG. 5 is a vector diagram of target and clutter signals located along the antenna boresight.

An accurate measure of $\phi$, therefore, would permit the determination of Vm, for known $V \sin \theta$, $\lambda$, and d. The vector diagram is shown in FIG. 5, where A and B are target and clutter amplitudes, respectively, and A1, A2 and A3, are the three composite vectors of target plus clutter corresponding to the signals received at the three antenna positions.

A direct phase angle measurement between A1 and A2 (or A2 and A3) would lead to a highly erroneous measure of $\phi$ because of the presence of clutter. However, by forming the vector subtractions $\Delta 1 = A2 - A1$ and $\Delta 2 = A3 - A2$, the clutter amplitudes cancel, and the phase angle, $\delta$, between $\Delta 1$ and $\Delta 2$ is seen to be identically equal to $\phi$, the phase advance of the mover between pulses in the absence of clutter. This operation can also be performed within the processor equipment.

Following the teachings of this invention, having obtained the moving target velocity, Vm, by setting $\phi = f$ in Equation 1, the quantity $-2Vm/\lambda$ represents the frequency by which the displayed moving target signal must be shifted so that it resides in a cell whose frequency represents that of clutter in the actual immediate vicinity of the moving target.

Referring to FIG. 3B, having determined the frequency shift $$-\frac{2 Vm}{\lambda},$$

the moving target is relocated the correct amount from $(\Delta f)_1$ to $(\Delta f)_3$ and assigned the azimuth angle, $(\Delta \theta)_3$, the true azimuth angle of clutter in the immediate vicinity of the moving target. In this way, the effect of the false clutter patch has been circumvented by its cancellation.

Figures 6A, 6B, 6C:
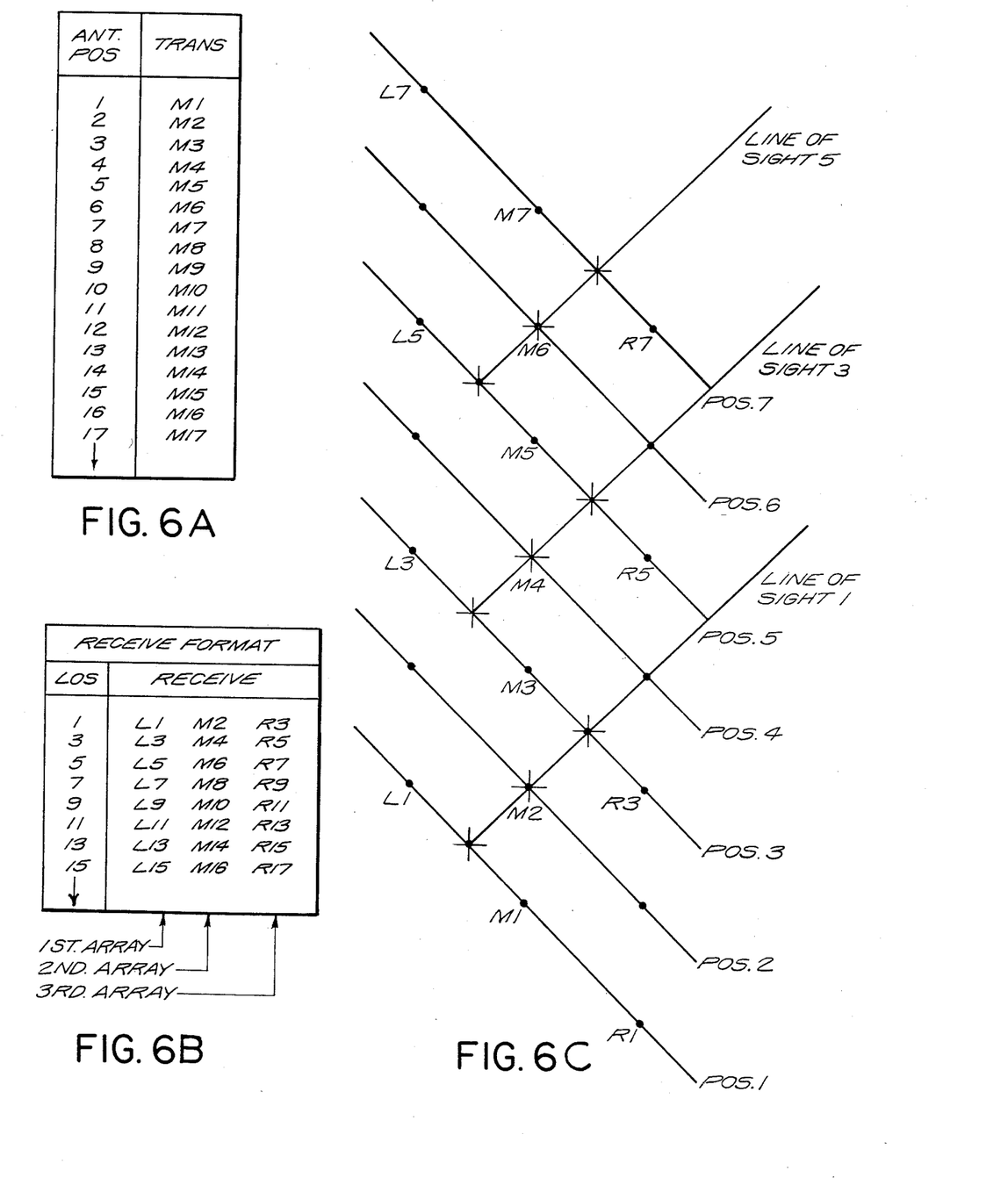

The three vectors, A1, A2 and A3, in FIG. 5 need not in the context of this invention, be restricted to three pulse returns, but in fact, represent the vector sums of three coherent integration processes. This is illustrated in FIG. 6C, which shows the antenna in successively advancing positions. FIG. 6A shows, for example, the transmission of 17 pulses, from transmit phase center positions M1 through M17. FIG. 6B shows the available lines of sight, LOS1, LOS3, LOS5, etc. for which usable pulse triplets result, (i.e., L1, M2, R3; L3, M4, R5; L5, M6, R7; etc.) It is evident that the range/doppler maps formed from the coherent integrations and doppler processing of the signals in the three columns of FIG. 6B can be used for moving target detection and accurate azimuth angle measurement of moving targets, where the number of points in the three arrays are determined by doppler filter bandwidth requirements, established according to the desired degree of resolution. Vectorial subtraction of the first map from the second on a cell-by-cell basis will indicate all uncancelled residues above a prescribed threshold as moving targets while the subtraction of the second from the third will provide the additional information required to determine all moving velocities, and hence, their corresponding true azimuth angles, by the techniques of this invention as presented in previous paragraphs. It is also evident from FIG. 6C that by receiving from R1 simultaneously with L1; R3 and L3; etc., interleaved interferometric measurements can be performed on stationary ground clutter and fixed targets so as to provide the necessary data for plotting interferometer azimuth angle versus doppler frequency (straight lines) which were previously shown to be essential for implementing the techniques of this invention. The same interferometric data can be processed for displayed imagery which may also be essential to carry out command guidance weapon delivery. On the basis of the foregoing, mapping, fixed target and clutter interferometry, and clutter suppressed moving target detection and azimuth angle measurements can be performed on the basis of concurrent data. It is important to note, unique to this invention, that the moving target azimuth angle so determined is within the interferometric frame of reference of the antenna and is thereby amenable to relative azimuth angle measurement with respect to a guided weapon, independent of any of the angle error sources associated with an absolute azimuth angle measuring system.

The achievement of the ultimate accuracy of this invention requires highly accurate estimates of $V \sin \theta$ and $V \cos \theta$, the aircraft velocity components perpendicular and parallel to the antenna electrical boresight, respectively. Without the former, azimuth relocation errors will result due to the erroneous estimate of Vm (see Equation 1), and without the latter, imperfect motion compensation will be applied to incoming signals resulting in corresponding errors in estimation of moving target velocity which would be further aggravated by incomplete clutter cancellation. The only source of these velocity components on-board the aircraft of sufficient accuracy is in the radar data base itself. Their determination represents another unique feature of this invention. Accordingly, $V \sin \theta$ is obtained from the slope of the straight line of clutter azimuth angle versus doppler frequency, since $d\theta/df = -\lambda/2V \sin \theta$ (see FIG. 3B). To obtain the best estimate of $d\theta/df$, the slopes of all the plots of azimuth angles versus doppler frequency for all the range bins processed are averaged. The value of $V \sin \theta$ so determined may also be used for prf control and for estimating moving target velocity. In order to obtain a precise estimate of $V \cos \theta$, the system may start with the best estimated value of $V \cos \theta$, obtained from available on-board inertial sensors. If this value were in error by a fixed value, $-\Delta V$, then the average value of the frequency axis intercepts taken over all range bins will result in an uncompensated boresight doppler frequency $(\Delta f)_o$. Conversely, the frequency bias can be used to continuously correct the estimated aircraft velocity component along the antenna boresight direction by adding to it an amount $-\lambda/2)(\Delta f)_o$ so as to provide a precise boresight velocity estimate correction to the on-board inertial navigation system at the end of each synthetic aperture interval. The corrected inertial system, therefore, provides an accurate instantaneous boresight velocity component, $V \cos \theta$. The sensed path length change to be used in applying a motion compensation phase correction to each signal of the receiving elements after a pulse repetition interval is, $V \cos \theta \times 1/\text{PRF}$. Accordingly, a phase correction of $-(4\pi/\lambda)(V \cos \theta/\text{PRF})$ is applied to the measured phase of each such received signal.

The motion compensation means may include various types of systems which compensate for phase variations of the received signal due to the effects of platform motion. Gain control systems may also be provided which compensate for changes in range, target cross section, transmission losses and weather conditions. Beam stabilization could also be added to accommodate either a gimballed or electronically scanned antenna system.

Figure 7:
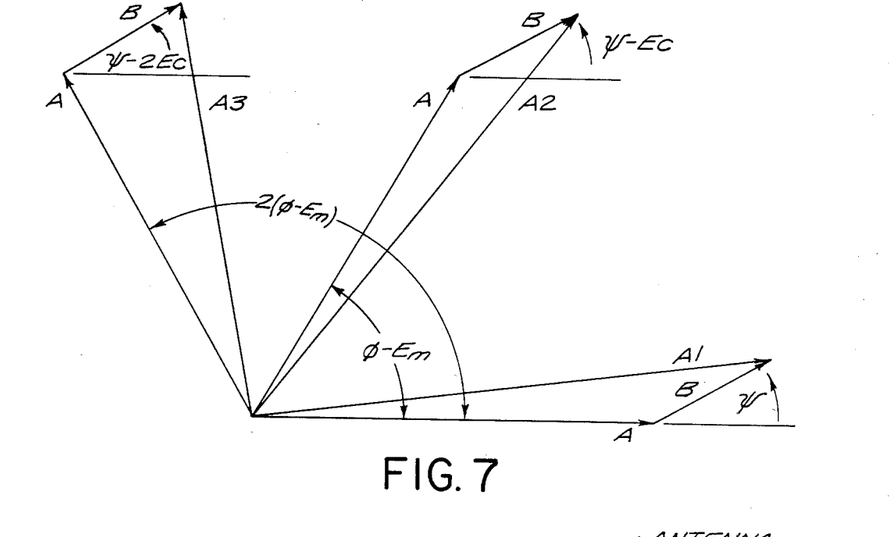
FIG. 7 is a vector diagram of signals reflected from a target and clutter located at off-boresight positions.
Figure 8:
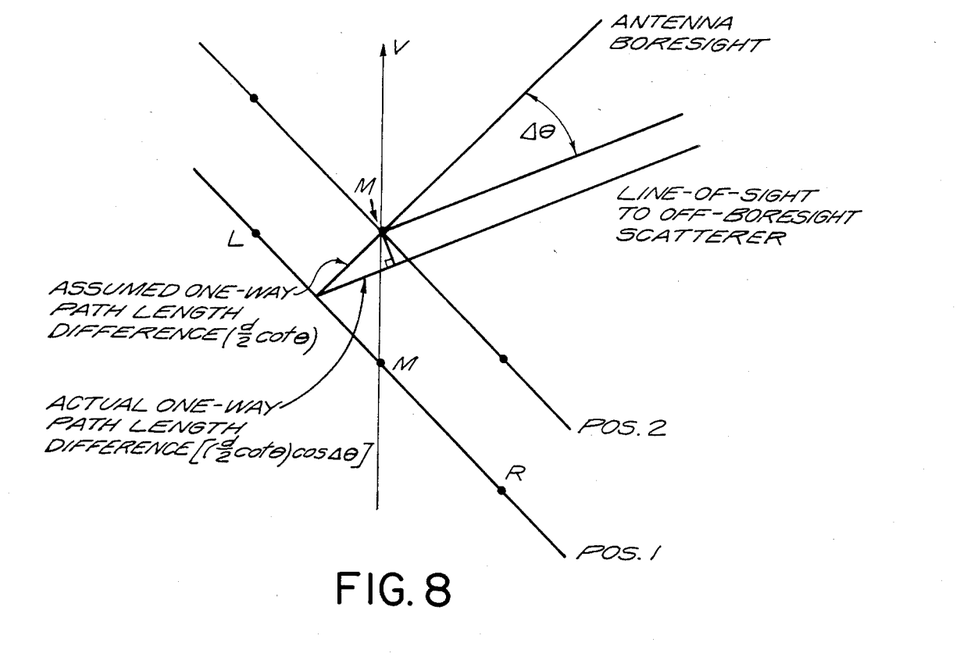
FIG. 8 illustrates the path length difference of an off-boresight scatterer with respect to the boresight motion compensated path length.

In general, the azimuth locations of moving target and false clutter patch may lie anywhere with respect to electrical boresight within the effective beam width of the radar. (The foregong was descriptive of boresight behavior only.) Since motion compensation of all received signals is referenced to a focus point along boresight, small phase errors are imparted to such off-boresight target and clutter signals, producing imperfect clutter cancellations and errors in $f$, both of which contribute to moving target velocity estimate errors. Although imperfect clutter cancellation may have negligible effect for clutter arising from natural terrain or foliage, its effect could be quite significant for larger discrete reflectors falling within the ambiguous clutter patch. Referring to FIG. 8 for a scatterer located at an angle of $\Delta\theta$ with respect to electrical boresight, the phase error due to the two-way path length difference between assumed and actual transmission paths is:

$$E = -\left(\frac{2\pi}{\lambda}\right)[d \cot \theta (1 - \cos \Delta\theta)] \quad (3)$$

where E describes the off-boresight phase error of the target or false clutter patch. For both moving target and false clutter patch located off-boresight, this error is such as to cause a clockwise (negative) rotation of target and clutter vectors of FIG. 5 with respect to those immediately preceding them. This is illustrated in FIG. 7, in which Em and Ec are the moving target and clutter phase errors denoted by equation (3) due to their off-boresight locations, and $\Psi$ is a clutter random starting phase.

Another feature of the present invention is that the potential deleterious effects of the phase errors arising from the off-boresight locations of target and clutter patches can be virtually eliminated, thereby preserving the intrinsic accuracy capability of this invention. From FIG. 3B, the off-boresight location of the false clutter patch is seen to be $(\Delta\theta)_2$, the interferometer azimuth angle of stationary clutter whose doppler frequency is that of the moving target. Equation (3), therefore, permits the estimation of Ec in FIG. 7. Rotation of vectors A2 and A3 of FIG. 7, by $\exp(jEc)$ and $\exp(2jEc)$, respectively, so that $A'2 = A2 \exp(jEc)$ and $A'3 = A3 \exp(2jEc)$, produces once more, parallel clutter vectors. Subsequent vector formation of $\Delta'1 = A'2 - A1$ and $\Delta'2 = A'3 - A'2$ allows cancellation of clutter to produce a moving target phase $\phi' = \phi - E + Ec$. In order to obtain the desired value of $\phi$ for use in equation (1) in solving for Vm, Em must be estimated, since Ec is known. This estimate of Em is obtained from equation (3), where the off-boresight azimuth angle of the moving target, $\Delta\theta_m$, is obtained from the interleaved interferometer measurements. For the interferometer, $$\Delta\theta_m = \sin^{-1}\left[\frac{\lambda Bm}{4\pi d}\right] \quad (4)$$

where Bm is the measured interferometer phase shift between left and right antenna segments, and $2d$ is the corresponding phase center spacing.

It is important to note the distinction between the use of the interferometer in the context of this invention and its use under conventional means for azimuth angle measurement. In the latter usage, false clutter patch signal returns can enter into the angle measurement in unattenuated form, and produce substantial azimuth angle measurement errors, generally considered to be unacceptable for precision weapon delivery. When used in the context of this invention, wherein the deleterious effects of clutter are virtually completely cancelled, the inexact interferometer measurement is used to reduce to insignificance a small error of second order importance, for a moving target located off-boresight, which arises because of the necessity to provide a single motion compensation along the antenna boresight direction.

At target velocities for which the value of $\phi$ is near zero, modulo $\pm 2\pi$, the vectors $\Delta 1$ and $\Delta 2$ formed by subtraction in FIG. 5, can become sufficiently small so that system thermal noise errors become overriding and are, therefore, not practical to be used. Setting $-10$ db as a practical limit to the ratio of $\Delta 1$ and $\Delta 2$ with respect to target signal amplitude, then these so called "blind speeds" occupy about 10% of the velocity spectrum. This characteristic is generally typical of clutter cancellation schemes and should also not limit the usefulness of the present invention, particularly when it is recognized that the component of target velocity in the radial direction is a constantly changing one due to the change in aircraft location as it moves, so that the potential loss in vehicle velocity measurement data due to a "blind speed" would be but a momentary one.

Figure 6D:
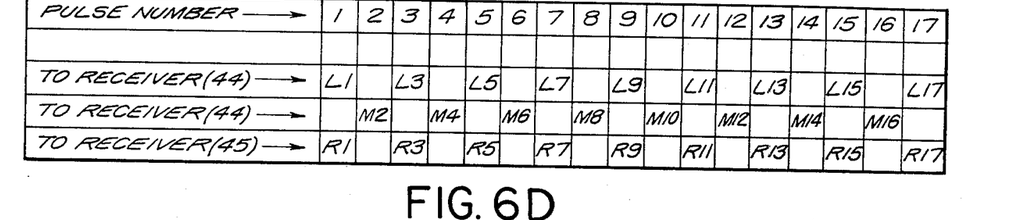
FIG. 6D illustrates signal routing through the (2) radar receivers.
Figure 9:
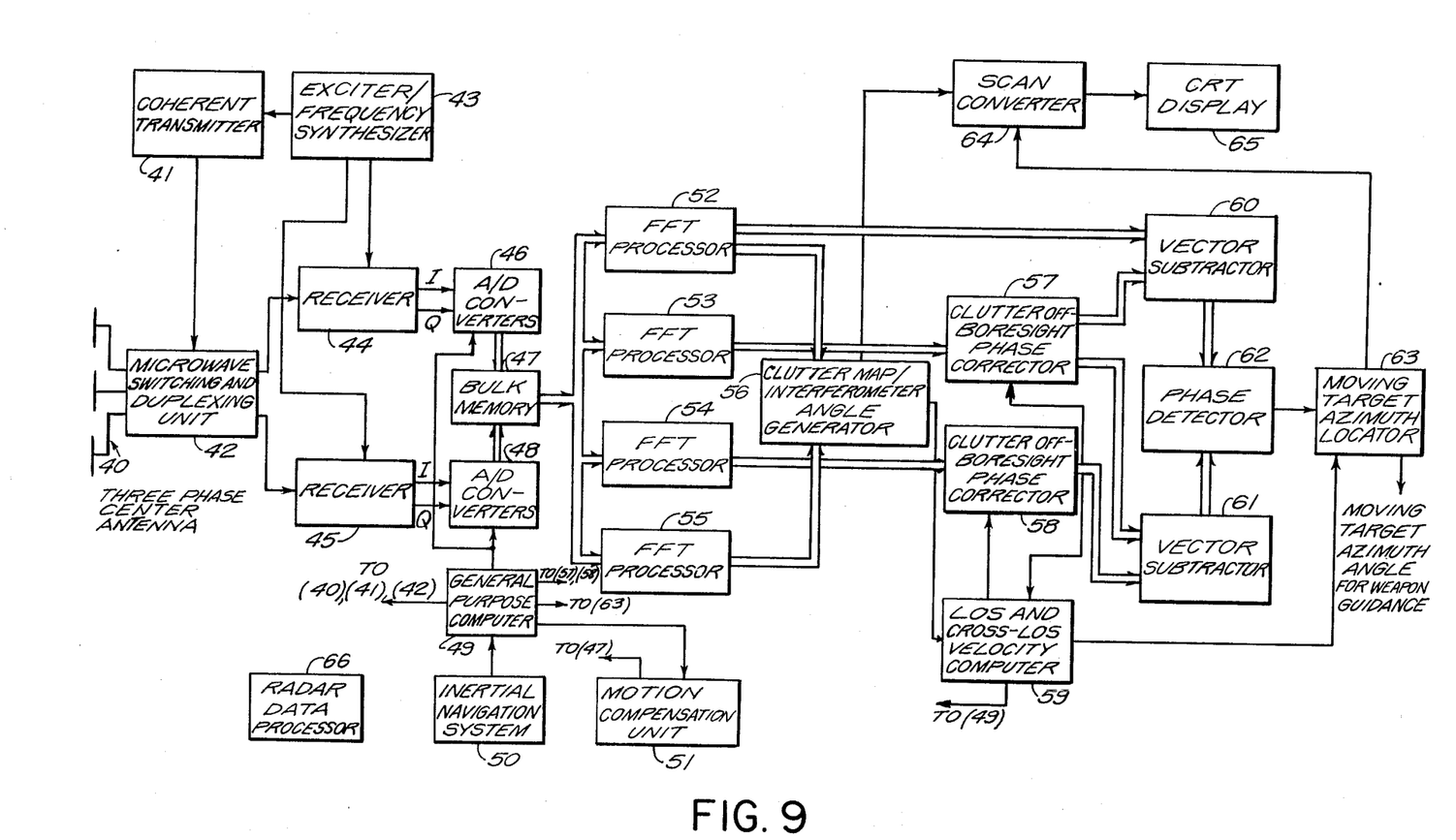
FIG. 9 is a block diagram representation illustrating the physical embodiments of the invention.

The operation of the system embodying the invention is illustrated with the use of the block diagram of FIG. 9. Pulses of electromagnetic energy generated in Coherent Transmitter 41 are passed through a Microwave Switching and Duplexing Unit 42 and radiated from the mid-phase center of a Three Phase Center Antenna 40. The spatial diagram of FIG. 4 depicts the progress of the Three Phase Center Antenna as the aircraft translates with horizontal velocity V. The antenna is controlled so that its electrical boresight is stabilized to a fixed focus point on the ground. Signals reflected from both fixed and moving targets can be received by all Three Phase Center Antennas. As pulses are transmitted consecutively at the requisite pulse repetition frequency ($f_r = 2V \sin \theta/d$), the Microwave Switching and Duplexing Unit 42 routes received signals at the receiving phase centers to Receivers 44 and 45 in accordance with the format described by FIG. 6D. Accordingly, on pulse 1, signals designated L1 and R1 are routed to Receivers 44 and 45, respectively; on pulse 2, the signal designated M2 is routed to Receiver 44, on pulse 3, signals designated L3 and R3 are again routed to Receivers 44 and 45, respectively; on pulse 4, the signal designated M4 is routed to Receiver 44, etc. Reference signals from the Exciter/Frequency Synthesizer 43, coherent with the transmittal signal, are applied to Receivers 44 and 45 to demodulate all target signals to quadrature related I and Q doppler shifted components, which represent the real and imaginary components of the instantaneous analog signal vectors out of the receivers. These analog signal components are digitized in the A/D Converters 46 and 48 at a sampling rate determined by system range resolution requirements. The precise timing for the start of A/D sampling on each pulse return so that corresponding samples from pulse-to-pulse over the coherent integration period represent the same range increment on the ground, is derived from the General Purpose Computer 49 on the basis of navigational inputs to it from the Inertial Navigation System 50. These digitized samples are stored in Bulk Memory 47 on a pulse-to-pulse basis. Concurrently, motion compensation corrections for antenna phase center translational and rotational motions are computed and stored in Motion Compensation Unit 51 in a time sequenced order on the basis of computations performed in General Purpose Computer 49 of the two-way line-of-sight displacement change between antenna phase centers and prescribed ground focus point in terms of the system's best estimated line-of-sight velocity which is tracked in General Purpose Computer 49. At the end of the various time sequences for which data is being collected, corrections stored in Motion Compensation Unit 51 are applied to the time sequences stored in Bulk Memory 47 in the form of vector rotations reflecting the two-way motion compensation phase correction to each range sample of each pulse of the various time sequences. After motion compensation correction, data is read out of Bulk Memory 47 (as new data is being entered) for Fourier Transform digital signal filtering required for azimuth resolution in each range bin. By way of illustration, FIG. 6B represents three 8-point sequences, each of which is capable of producing, after signal processing, a range and doppler resolved map, from which moving target detection and relocation, on the basis of the analytic procedures depicted by FIG. 5, can be performed for each and every resolution cell processed. (In general, longer sequences are used depending upon resolution requirements.) Accordingly, the motion compensated sequences read out of Bulk Memory 47 are inputted to FFT Processors 52, 53 and 54 which perform Fast Fourier Transform digital processing so as to produce azimuth resolved coherently integrated vector sums in each range bin and for each of the three sequences. Concurrently, (and continuing with the illustration of FIG. 6D), a fourth sequence, i.e., R1, R3, R5, . . . , R15, is read out of Bulk Memory 47 and inputted to FFT Processor 55 for digital signal processing, analogous to the processing performed on the three other sequences. The range/doppler maps generated in the first and fourth processors, FFT Processors 52 and 55, are integrated in Clutter Map/Interferometer Angle Generator 56 and stored in Scan Converter 64 for summation with cursor video signals generated in Scan Converter 64, and for image intensity scaling, prior to inputting to CRT Display 65 for image presentation of the target field. Also, since the range/doppler maps processed by FFT Processors 52 and 55 represent pulse sequences that are coincident in time, comparison of the electrical phase of the respective vectors in each range/doppler cell produces the azimuth angle of each resolution cell in accordance with well known interferometric principles (see equation (4)). The azimuth angle data so obtained is inputted to LOS and Cross-LOS Velocity Computer 59 which produces accurate estimates of line-of-sight (V cos $\theta$) and cross line-of-sight (V sin $\theta$) velocities using least squares regression techniques, required, respectively, for precise motion compensation and prf control. Also, those range/doppler cells containing moving targets are identified (detected) in the LOS and Cross-LOS Velocity Computer 59 as described by the earlier discussion related to FIG. 3B. The range and doppler resolved maps generated by FFT Processors 52, 53 and 54 are now of the form for achieving clutter cancellation, in accordance with the implementations of this invention and as represented vectorially for a single moving target by FIG. 5, and for determining velocity and azimuth angle location, suitably corrected for the off-boresight locations of moving target and interfering false clutter patch. Each range/doppler resolution cell containing a moving target as determined by LOS and Cross-LOS Computer (59), is identified to Clutter Off Boresight Phase Correctors 57 and 58, as well as the off-boresight azimuth angle location, $(\Delta\theta)_2$, (see FIG. 3B) of the false clutter patch lying in the same doppler filter, $(\Delta f)_1$ as the identified moving target. For each such identified clutter cell, the off-boresight phase correction, Ec, is computed from equation (3) in Clutter Off-Boresight Phase Correctors 57 and 58 on the basis of interferometer boresight bearing angle $\theta$, and constants $\lambda$ and d, derived from General Purpose Computer 49. The outputs of FFT Processors 53 and 54, containing vectors A2 and A3, illustrated in FIG. 7 of all identified moving target resolution cells, are suitably rotated in accordance with the determined phase shift values Ec, in Clutter Off-Boresight Phase Correctors 57 and 58, in accordance with the teachings of this invention, so that the clutter vectors B (FIG. 7) are brought into parallelism.

The output of Clutter Off-Boresight Phase Corrector 57 containing all range/doppler resolved vectors A'2 =A2 exp(jEc) (representing those cells containing moving targets) is inputted to Vector Subtractor 60, in conjunction with corresponding outputs from FFT Processor 52, representing vectors A1 (in FIG. 7), to form the vector subtraction for each moving target, $\Delta'1 = A'2 - A1$. Similarly, the outputs of Clutter Off-Boresight Phase Correctors 57 and 58 are inputted to Vector Subtractor 61 to produce the vector $\Delta'2 = A'3 - A'2$, where $A'3 = A3 \exp(2jEc)$, for each identified moving target resolution cell. The outputs of Vector Subtractors 60 and 61 are, in turn, inputted to Phase Detector 62 which produces, for each moving target cell a moving target phase $\phi' = \phi - Em + Ec$, where $\phi$ is the desired measure of moving target velocity, as denoted by equation (1). The solution for $\phi$ requires, therefore, a knowledge of Em, the motion compensation phase correction due to the off-boresight location of the moving target. An adequate measure of the latter is obtained from the LOS and Cross-LOS Velocity Computer 59, and is the interferometric measurement denoted by $(\Delta\theta)_1$ in FIG. 3B. The solution of equation (3), is therefore implemented in Moving Target Azimuth Locator 63 for $\Delta\theta = (\Delta\theta)_1$, d, $\theta$ and $\phi$ obtained from General Purpose Computer 49. The moving target phase angle, $\phi$, is therefore determined in Moving Target Azimuth Locator 63 on the basis of the inputted value of $f'$ from Phase Detector 62, and determined off-boresight phase corrections, Em and Ec, where the latter is communicated from Clutter Off-Boresight Phase Corrector 57 through LOS and Cross-LOS Velocity Computer 59 to Moving Target Azimuth Locator 63. Moving target velocity, Vm, for each identified moving target, is determined using equation (1) in Moving Target Locator 63, and where the aircraft cross line-of-sight velocity, $V \sin \theta$, is inputted from LOS and Cross-LOS Computer 59. In accordance with the teachings of this invention, the quantity $$\frac{2 Vm}{\lambda},$$

computed in Moving Target Locator 63, permits the determination of $(\Delta f)_3$ (see FIG. 3B), and $(\Delta\theta)_3$, on the basis of data transferred from LOS and Cross-LOS Velocity Computer 59, for each moving target, which represent, respectively, target doppler frequency were it not moving, so that it could be positioned accurately on a range/doppler display within the context of its displayed stationary surroundings, and interferometric azimuth angle, uncorrupted by clutter effects. The determined doppler frequency, $(\Delta f)_3$, is inputted to Scan Converter 64, so as to properly relocate the moving target on CRT Display 65. Also, for each moving target, the value $(\Delta\theta)_3$ represents the moving target azimuth angle to be used for weapon guidance. It is important to note that this determined value of azimuth angle, unique to this invention, represents the moving target azimuth angle referred to the electrical boresight of the antenna, against which interferometric azimuth angle measurements (using the two outer phase centers) of a weapon borne transponder location are compared for relative range and relative azimuth angle weapon guidance, irrespective of large angle measurement errors such as gimbal readout, antenna boresight and aircraft navigational errors, which normally accompany absolute angle measurement systems.

The above measurement processes are continuous ones, in that as data is read out of Bulk Memory 47, new data is being entered, which subsequently gets processed at the end of appropriate time sequences dictated by resolution requirements, and so on. Additionally, control signals for the pointing of Antenna 40, prf control of Coherent Transmitter 41, and antenna phase center switching at Microwave Switching and Duplexing Unit 42 are obtained from General Purpose Computer 49. All task management such as data transmission and initiation of subroutine sequences are performed by the Radar Data Processor 66.

All transmitting, receiving, and processing units delineated in FIG. 9 can be either manufactured or purchased as separate commercial entities and incorporated into the embodiments of this invention by those skilled in the art. Also, many of the functional units shown separately in FIG. 9 can be combined for purposes of design economy.

Although the invention has been described and illustrated in detail, it is to be understood that the same is exemplary and is not to be taken by way of limitation, the spirit and scope of this invention being limited only by the terms of the appended claims.

What is claimed is:

1. In conjunction with an AMTI synthetic aperture radar system having an interferometer antenna and a range versus azimuth angle display, a method for determining with improved accuracy the azimuth angle of a moving target having a radial component of velocity relative to the electrical boresight of the interferometer antenna comprising the steps of:
   (a) calculating the radial component of velocity Vm of the moving target;
   (b) shifting the observed net doppler frequency of the moving target by the quantity $$-\frac{2 Vm}{\lambda}$$

where $\lambda$ is the operating wavelength of the radar system, so that the moving target resides in a doppler cell whose frequency corresponds to that of clutter in the immediate vicinity of the moving target;
   (c) plotting the data obtained from interleaved interferometric measurements on the received signals from stationary clutter and fixed targets as doppler frequency versus interferometer azimuth angle; and
   (d) obtaining from the plot of doppler frequency versus interferometer azimuth angle for the stationary clutter and fixed targets the azimuth angle relative to the electrical boresight of the antenna of clutter in the immediate vicinity of the moving target.

2. A method as recited in claim 1 including the further step of positioning in accordance with the shifted doppler frequency and the obtained azimuth angle information the moving target on the range versus azimuth angle display.

3. A method as recited in claim 1 including the further step of reducing to negligible levels second order phase errors resulting from off-boresight location of the moving target and stationary clutter.

4. A method as recited in claim 2 including the further step of reducing the negligible levels second order phase errors resulting from off-boresight location of the moving target and stationary clutter.

5. A method as recited in claim 1 wherein the step of compensating for aircraft motion includes accurately determining the component of aircraft velocity parallel to the antenna boresight direction $V \cos \theta$ in order to motion compensate the received signals on a pulse-to-pulse basis.

6. A method as recited in claim 2 wherein the step of compensation for aircraft motion includes accurately determining the component of aircraft velocity parallel to the antenna boresight direction V cos $\theta$ in order to motion compensate the received signals on a pulse-to-pulse basis.

7. A method as recited in claim 5 wherein the step of calculating the radial component of velocity Vm of the moving target includes:
   (a) estimating the component of aircraft velocity perpendicular to the antenna boresight direction V sin $\theta$ from a composite plot generated by averaging the slopes of the individual plots of doppler frequency versus interferometer azimuth angle for each of the range bins processed;
   (b) determining the phase advance $\phi$ from a series of vector substractions $\Delta 1 = A2 - A1$ and $\Delta 2 = A3 - A2$, where A1, A2, and A3 are coherent integration vector sums and setting $\phi = \int$, where $\int$ is the measured phase angle between $\Delta 1$ and $\Delta 2$; and
   (c) calculating the value of Vm from the expression $$\phi = \frac{2\pi d}{\lambda} \frac{Vm}{V\sin\theta}$$

where d is the spacing between the interferometer antenna phase centers.

8. A method as recited in claim 6 wherein the step of calculating the radial component of velocity Vm of the moving target includes:
   (a) estimating the component of aircraft velocity perpendicular to the antenna boresight direction V sin $\theta$ from a composite plot generated by averaging the slopes of the individual plots of doppler frequency versus interferometer azimuth angle for each of the range bins processed;
   (b) determining the phase advance $\phi$ from a series of vector subtractions $\Delta 1 = A2 - A1$ and $\Delta 2 = A3 - A2$, where A1, A2, and A3 are coherent integration vector sums and setting $\phi = \int$, where $\int$ is the measured phase angle between $\Delta 1$ and $\Delta 2$; and
   (c) calculating the value of Vm from the expression $$\phi = \frac{2\pi d}{\lambda} \frac{Vm}{V\sin\theta}$$

where d is the spacing between the interferometer antenna phase centers.

9. A method as recited in claim 7 including the further step of reducing to negligible levels second order phase errors resulting from off-boresight location of the moving target and stationary clutter, such steps including:
   (a) estimating for the stationary clutting lying in the same doppler filter as the moving target the off-boresight phase correction Ec from the expression $$Ec = \frac{-(2\pi)}{\lambda} [d \cot \theta (1 - \cos\Delta\theta)]$$

where $\Delta\theta_c$ is the interferometer azimuth angle of the stationary clutter whose doppler frequency is that of the moving target;
   (b) estimating for the moving target the off-boresight phase correction Em from the expression $$Em = \frac{-(2\pi)}{\lambda} [d \cot \theta (1 - \cos\Delta\theta_m)]$$

where $\Delta\theta_m$ is determined from interleaved interferometer measurements and the expression $$\Delta\theta_m = \sin^{-1}$$

where Bm is the measured interferometer phase shift between left and right antenna segments;
   (c) determining the phase advance $\phi'$ from a series of vector substractions $\Delta'1 = A'2 - A1$ and $\Delta'2 = A'3 - A'2$, where A1, A'2 and A'3 are coherent integration vector sums and setting $\phi' = \int'$, where $\int'$ is the measured phase angle between $\Delta'1$ and $\Delta'2$;
   (d) calculating the value of $\phi$ from the expression $\phi' = \phi - Em + Ec$; and
   (e) using the calculating value of $\phi$ to determine the value of Vm from the expression $$\phi = \frac{2\pi d}{\lambda} \frac{Vm}{V\sin\theta}.$$

10. A method as recited in claim 8 including the further step of reducing to negligible levels second order phase errors resulting from off-boresight location of the moving target and stationary clutter, such step including:
   (a) estimating for the stationary clutter lying in the same doppler filter as the moving target the off-boresight phase correction Ec from the expression $$Ec = \frac{-(2\pi)}{\lambda} [d \cot \theta (1 - \cos\Delta\theta_c)]$$

where $\Delta\theta_c$ is the interferometer azimuth angle of the stationary clutter whose doppler frequency is that of the moving target;
   (b) estimating for the moving target the off-boresight phase correction Em from the expression $$Em = \frac{-(2\pi)}{\lambda} [d \cot \theta (1 - \cos\Delta\theta_m)]$$

where $\Delta\theta_m$ is determined from interleaved interferometer measurements and the expression $$\Delta\phi_m = \sin^{-1}$$

where Bm is the measured interferometer phase shift between left and right antenna segments;
   (c) determining the phase advance $\phi'$ from a series of vector subtractions $\Delta'1 = A'2 - A1$ and $\Delta'2 = A'3 - A'2$, where A1, A'2 and A'3 are coherent integration vecotr sums and setting $\phi' = \int'$, where $\int'$ is the measured phase angle between $\Delta'1$ and $\Delta'2$;
   (d) calculating the value of $\phi$ from the expression $\phi' = \phi - Em + Ec$; and
   (e) using the calculated value of $\phi$ to determine the value of Vm from the expression $$\phi = \frac{2\pi d}{\lambda} \frac{Vm}{V\sin\theta}.$$

11. In combination with an AMTI synthetic aperture radar system having an interferometer antenna and a range versus azimuth angle display, signal processing means for determining with improved accuracy the azimuth angle of a moving target having a radial component of velocity relative to the electrical boresight of the interferometer antenna comprising:

(a) means for calculating the radial component of velocity Vm of the moving target, and shifting the observed net doppler frequency of the moving target by the quantity $$-\frac{2 Vm}{\lambda}$$

where $\lambda$ is the operating wavelength of the radar system, so that the moving target resides in a doppler cell whose frequency corresponds to that of clutter in the immediate vicinity of the moving target;

(b) means for plotting the data obtained from interleaved interferometric measurements on the received signals from stationary clutter and fixed targets as doppler frequency versus interferometer azimuth angle; and (c) means for obtaining from the plot of doppler frequency versus interferometer azimuth angle for the stationary clutter and fixed targets the azimuth angle relative to the electrical boresight of the antenna of clutter in the immediate vicinity of the moving target.

12. A combination as recited in claim 11 wherein the signal processing means further includes means for positioning in accordance with the shifted doppler frequency and the obtained azimuth angle information the moving target on the range versus azimuth angle display.

13. A combination as recited in claim 12 wherein the signal processing means further includes means for reducing to negligible levels second order phase errors resulting from off-boresight location of the moving target and stationary clutter.

14. A combination as recited in claim 11 wherein the signal processing means further includes means for reducing to negligible levels second order phase errors resulting from off-boresight location of the moving target and stationary clutter.

15. In combination with an AMTI synthetic aperture radar system including a three phase center interferometer antenna operatively connected to the input to a two channel receiver and processing system, and a real-time display of range versus azimuth angle operatively connected to the output of said two channel receiver and processing system, signal processing means for determining with improved accuracy the azimuth angle of a moving target having a radial component of velocity relative to the electrical boresight of the interferometer antenna comprising:

(a) means for compensating for phase variations in the received signals due to motion of the AMTI radar bearing aircraft, said motion compensating means including means for accurately determining the component of aircraft velocity parallel to the antenna boresight direction $V \cos \theta$ in order to motion compensate the received signals on a pulse-to-pulse basis;

(b) means for calculating the radial component of velocity Vm of the moving target, said velocity calculating means including:

(1) means for estimating the component of aircraft velocity perpendicular to the antenna boresight direction $V \sin \theta$ from a composite plot generated by averaging the slopes of the individual plots of doppler frequency versus interferometer azimuth angle of each of the range bins processed;

(2) means for determining the phase advance $\phi$ from a series of vector substractions, $\Delta 1 = A2 - A1$ and $\Delta 2 = A3 - A2$, where A1, A2, and A3 are coherent integration vector sums and setting $\phi = f$, where $f$ is the measured phase angle between $\Delta 1$ and $\Delta 2$; and (3) means for calculating the value of Vm from the expression $$\phi = \frac{2\pi d}{\lambda} \frac{Vm}{V \sin \theta}$$

where $\lambda$ is the operating wavelength of the radar and d is the spacing between the interferometer antenna phase centers; and for shifting the observed net doppler frequency of the moving target by the quantity $$-\frac{2 Vm}{\lambda}$$

so that the moving target resides in a doppler cell whose frequency corresponds to that of clutter in the immediate vicinity of the moving target;

(c) means for plotting the data obtained from interleaved interferometric measurements on the received signals from stationary clutter and fixed targets as doppler frequency versus interferometer azimuth angle; and (d) means for obtaining from the plot of doppler frequency versus interferometer azimuth angle for the stationary clutter and fixed targets the azimuth angle relative to the electrical boresight of clutter in the immediate vicinity of the moving target.

16. A combination as recited in claim 15 wherein the signal processing means further includes means for reducing to negligible levels second order phase errors resulting from off-boresight location of the moving target and stationary clutter, said means including:

(a) means for estimating for the stationary clutter lying in the same doppler filter as the moving target the off-boresight phase correction Ec from the expression $$Ec = \frac{-(2\pi)}{\lambda} [d \cot \theta (1 - \cos \Delta \theta_c)]$$

where $\Delta \theta_c$ is the interferometer azimuth angle of the stationary clutter whose doppler frequency is that of the moving target;

(b) means for estimating for the moving target the off-boresight phase correction Em from the expression $$Em = \frac{-(2\pi)}{\lambda} [d \cot \theta (1 - \cos \Delta \theta_m)]$$

where $\Delta \theta_m$ is determined from interleaved interferometer measurements and the expression $$\Delta \theta_m = \sin^{-1}$$

where Bm is the measured interferometer phase shift between left and right antenna segments;

(c) means for determining the phase advance $\phi'$ from a series of vector subtractions, $\Delta'1 = A'2 - A1$ and $\Delta'2 = A'3 - A'2$, where A1, A'2 and A'3 are coherent integration vector sums and setting $\phi' = \int'$, where $\int'$ is the measured phase angle between $\Delta'1$ and $\Delta'2$;

(d) means for calculating the value of $\phi$ from the expression $\phi' = \phi - Em + Ec$; and (e) means for using the calculated value $\phi$ and determining the value of Vm from the expression $$\phi = \frac{2\pi d}{\lambda} \frac{Vm}{V\sin\theta}.$$

17. A combination as recited in claim 16 wherein the signal processing means further includes means for positioning in accordance with the shifted doppler frequency and the obtained azimuth angle information the moving target on the range versus azimuth angle display.

* * * * *

UNITED STATES PATENT AND TRADEMARK OFFICE
CERTIFICATE OF CORRECTION

PATENT NO. : 4,549,184

DATED : October 22, 1985

INVENTOR(S) : SOL BOLES ET AL

It is certified that error appears in the above-identified patent and that said Letters Patent is hereby corrected as shown below:

Title page [57], the second and third lines of the second paragraph, delete "the measurement of target radial velocity also provides"

Col. 1, lines 47 and 48, change "projecting" to -- projected --

Col. 5, line 4, change "sight" to -- signal --

Col. 7, line 62, change "$\phi = f$" to -- $\phi = \delta$ --

Col. 9, line 18, change "$(\Delta f)o$" to -- $(\Delta f)_o$ --
line 22, change "$- \lambda/2)(\Delta f)o$" to -- $-(\lambda/2)(\Delta f)_o$ --
line 45, change "foregong" to -- foregoing --
line 50, change "$f$" to -- $\delta$ --

Col. 10, line 22, change "$\phi' = \phi - E + Ec$" to -- $\phi' = \phi - Em + Ec$ --

Col. 13, line 8, change "$\phi' = \phi - Em + Ec$" to -- $\delta' = \phi' - Em + Ec$ --
line 18, change "$\phi$" to -- $\lambda$ --
line 22, change "$f'$" to -- $\delta'$ --

Col. 15, (claim 7), line 17, change "substractions" to -- subtractions --
line 19, change "$\phi = f$" to -- $\phi = \delta$ --; change "$f$" to -- $\delta$ --

(claim 8), line 42, change "$\phi = f$" to -- $\phi = \delta$ --; change "$f$" to -- $\delta$ --

(claim 9), line 56, change "clutting" to -- clutter -- line 62, change "$Ec = -\frac{(2\pi)}{\lambda} [d \cot \theta (1 - \cos \Delta\theta)]$" to -- $Ec = -\frac{(2\pi)}{\lambda} [d \cot \theta (1 - \cos \Delta\theta_c)]$ --

UNITED STATES PATENT AND TRADEMARK OFFICE
CERTIFICATE OF CORRECTION

PATENT NO. : 4,549,184
DATED : October 22, 1985
INVENTOR(S) : SOL BOLES ET AL

It is certified that error appears in the above-identified patent and that said Letters Patent is hereby corrected as shown below:

Col. 16 (claim 9), line 8, change "$\Delta\Theta_m = \sin^{-1}$" to

-- $\Delta\Theta_m = \sin^{-1}\left[\dfrac{\lambda Bm}{4\pi d}\right]$ -- line 13, change "substractions" to -- subtractions --
line 15, change "$\phi' = f'$" to -- $\phi' = \delta'$ --; change "$f'$" to -- $\delta'$ -- line 19, change "calculating" to -- calculated --

(claim 10), line 50, change "$\Delta\phi_m = \sin^{-1}$" to

-- $\Delta\phi_m = \sin^{-1}\left[\dfrac{\lambda Bm}{4\pi d}\right]$ -- line 57, change "vecotr" to -- vector --; change "$\phi' = f'$" to -- $\phi' = \delta'$ --; change "$f'$" to -- $\delta'$ --

Col. 18 (claim 15), line 9, change "$\phi = f$" to -- $\phi = \delta$ --; change "$f$" to -- $\delta$ --

(claim 16), line 67, change "$\Delta\Theta_m = \sin^{-1}$" to

-- $\Delta\Theta_m = \sin^{-1}\left[\dfrac{\lambda Bm}{4\pi d}\right]$ --

UNITED STATES PATENT AND TRADEMARK OFFICE
CERTIFICATE OF CORRECTION

PATENT NO. : 4,549,184

DATED : October 22, 1985

INVENTOR(S) : Sol Boles et al.

It is certified that error appears in the above-identified patent and that said Letters Patent is hereby corrected as shown below:

Col. 19 (claim 16), line 8, change "$\phi' = f'$" to -- $\phi' = \delta'$ --
line 9, change "$f'$" to -- $\delta'$ --

Signed and Sealed this

Thirty-first Day of March, 1987

Attest:

DONALD J. QUIGG

Attesting Officer

Commissioner of Patents and Trademarks